May 10, 1932.                C. J. LAMB                1,857,961

BI-METAL PACKING

Filed Dec. 15, 1927

WITNESS
E. Lutz

INVENTOR
C. J. Lamb
BY
A. B. Reavis
ATTORNEY

UNITED STATES PATENT OFFICE

CARL J. LAMB, OF PHILADELPHIA, PENNSYLVANIA, ASSIGNOR TO WESTINGHOUSE ELECTRIC & MANUFACTURING COMPANY, A CORPORATION OF PENNSYLVANIA

BI-METAL PACKING

Application filed December 15, 1927. Serial No. 240,233.

My invention relates to labyrinth packing, and it has for its object to provide means for maintaining close clearances in said packing.

It also has for its object to change the clearance with changes in operating conditions, such as changes in temperature, and a specific object is to provide clearance in case of accidental rubbing, thereby stopping further rubbing and injury to the packing.

In the design of labyrinth packing for sealing the spaces between two relatively rotatable members, the clearances between the packing elements are made very close in order to minimize fluid leakage therebetween. In actual operation, such packing is liable to rub due to inaccuracies in manufacture, unequal expansion of the members upon heating, or other causes.

In accordance with my invention, I provide an element composed of laminæ of two substances having different coefficients of expansion, and I so dispose said element that a change in temperature therein will distort said element to vary the clearance provided thereby. To provide an increased clearance upon rubbing, the packing element is disposed with the laminæ of material having a higher coefficient of expansion on the side adjacent the clearance.

Apparatus exemplifying my invention is shown in the accompanying drawings, wherein.

Figure 1:
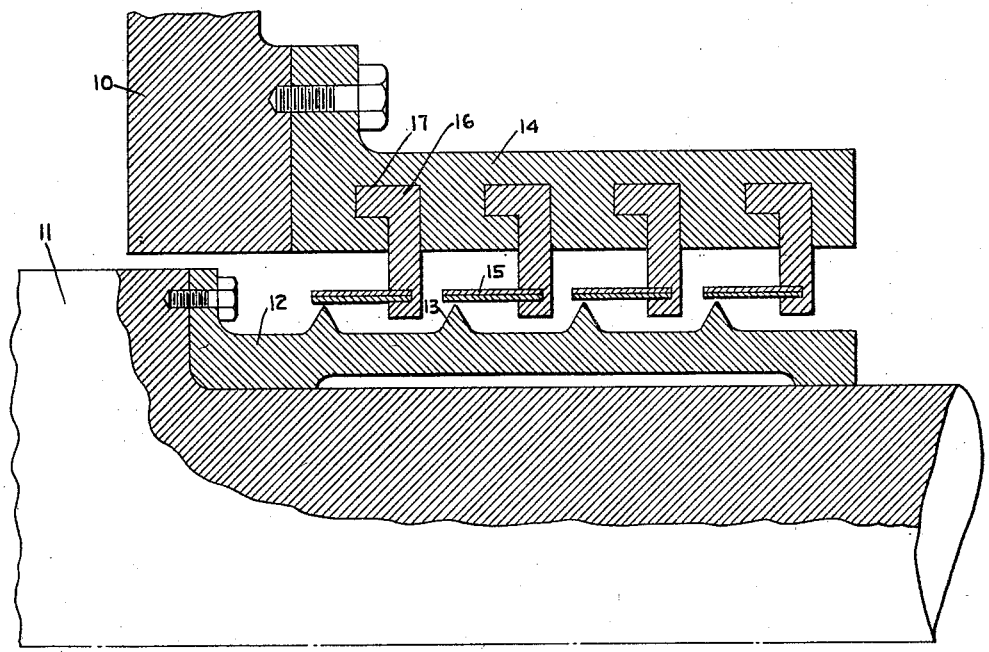
Fig. 1 is a sectional view of one form of my invention.

Referring to the drawings in detail, I show fragments of a casing 10 and a shaft 11 of any fluid machine, such as a steam turbine. The shaft carries a sleeve or ring 12 secured thereon and having packing elements 13 extending outwardly therefrom, and preferably integral therewith. A stationary ring 14 is secured to the casing 10 and encompasses the ring 12. Stationary bi-metal packing elements 15, encompassing and cooperating with the rotating packing elements 13, are supported by the ring 14. Supporting strips 16, having root portions secured in grooves 17 in the ring, project radially inwardly from the ring, the projecting portions having grooves in which the edges of the packing elements 15 are secured.

In this embodiment, the packing elements 15 extend substantially axially of the shaft. These strips are composed of thermostatic metal, that is, laminæ of metals having different coefficients of expansion. For example, brass and invar steel may be used, the former having a high coefficient and the latter a slight or zero coefficient. It is to be understood, of course, that any other two metals, or other substances, having different coefficients of expansion may be used. Where it is desired to increase the clearance upon accidental rubbing, the lamina of metal having the higher coefficient of expansion is disposed on the inner side facing the adjacent packing element 13, and the other lamina having the lower, or possible zero or negative coefficient, is disposed on the outer side encompassing the first lamina.

The operation of this embodiment is as follows:

Suppose that the pressure within the casing 10 is above atmospheric pressure. The fluid within the casing therefore tends to flow through the packing to the right as shown on the drawings, a small amount flowing through the clearance between the first pair of cooperating packing elements 13 and 15, and building up pressure and flowing successively through the other pairs of packing elements, each time being reduced in pressure, as is well known in the art of labyrinth packing.

Should one of the packing elements 15 rub against the adjacent packing element 13, the heat generated raises the temperature of the packing elements. As the temperature increases, the metal of the packing element 15 having the higher coefficient of expansion expands more than the other metal causing the element to bend upwardly away from the packing element 13, thereby increasing the clearance and stopping the rubbing.

When the turbine is shut down and allowed to cool, the bi-metal packing elements may bend and bear against the packing elements 13. In starting, however, a quantity of steam is admitted to the turbine before the rotor starts turning over, which steam heats the bi-metal packing elements and returns them to their operating position.

It will thus be seen that danger of injury to the packing elements by rubbing is eliminated or minimized, inasmuch as the clearance is immediately increased when the rubbing begins.

Figure 2:
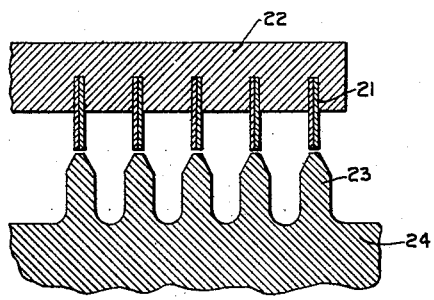
Figs. 2, 3, 4 and 5 are sectional views, each showing a modified embodiment of the invention.

In Fig. 2, I show an embodiment of my invention in which stationary bi-metal packing elements 21 extend radially inwardly from a stationary member 22 to packing elements 23 carried on the shaft 24. The ends of the packing elements are tapered or bevelled, so that movement of the packing elements 21 in either axial direction causes increased clearance. At the temperature of normal operation of the machine with which the packing is associated, the ends of the elements 21 are opposite the tips of the elements 23, but in case of rubbing the elements 21 move in an axial direction to provide an axial clearance, thereby avoiding further rubbing.

An advantage of this form is that it eliminates any difficulty which might be encountered by reason of bi-metal packing elements taking up all clearance when the machine is not in operation, and cooled to normal atmospheric temperature. With this form, when the bi-metal packing elements 21 cool below operating temperature, they merely move in an axial direction opposite to that in which they move when heated, without taking up the normal clearances.

Figure 3:
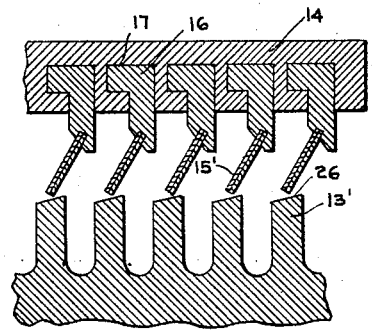

In Fig. 3, is shown an embodiment somewhat similar to Fig. 1. In this case, the bi-metal packing elements 15′ extend obliquely to the inclined surfaces 26 of the rotary packing elements 13′. This arrangement permits the rotor to be easily moved to adjust the packing clearances.

Figure 4:
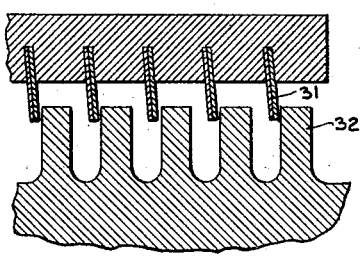

Fig. 4 shows an embodiment in which axial clearances are formed between the packing elements. The bi-metal packing elements 31 extend inwardly at a slight angle to the radius, and pack against the radial surfaces of the rotary packing elements 32. The metal having the higher coefficient of expansion is disposed on the side adjacent the packing elements 32, and hence, in case of rubbing, the bi-metal packing elements move to the left to increase the clearances.

Figure 5:
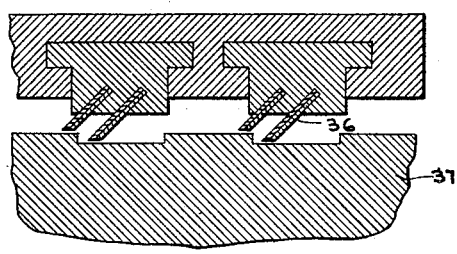

In Fig. 5, is shown a still further modification in which the bi-metal packing elements 36 extend diagonally to cylindrical surfaces on the rotor 37, and pack by radial clearance. In case of rubbing, the radial clearance is increased as explained in connection with Fig. 1.

I have described the bi-metal packing elements in the modifications shown in Figs. 1, 3, 4 and 5, with the metal of higher coefficient of expansion on the side forming the clearance, so that heating of the bi-metal element, such as may occur in case of rubbing, increases the clearance. As will be apparent, this provides for the safety of the packing structure. In some cases, however, economy of operation may be of greater importance than safety of the packing elements. In the operation of a large turbine, the greatest packing difficulties are encountered in starting operation, due to the fact that the rotor distorts when changing temperature. It may, therefore, be found desirable to provide greater clearances while starting and to decrease the clearances when the turbine, or other machine, is in full operation. To accomplish this, the bi-metal packing elements may be reversed, that is, the metal having the lower coefficient of expansion may be placed on the packing side or on the side forming the clearance. With such arrangement, when the turbine is cooled, the clearance would be large, and under heavy load, after being placed in operation, the clearance would be decreased in order to provide minimum leakage and maximum efficiency of the turbine.

It will thus be seen that I have provided a novel means of varying the clearance in a labyrinth packing elements, which is adapted to be used in numerous different ways.

While I have shown by invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are set forth in the appended claim.

What I claim is:

In a labyrinth packing for two relatively rotatable members, an annular packing element carried by one member and extending substantially radially outwardly therefrom, and a second annular packing element carried by the other member and extending substantially radially inwardly in axial-clearance packing relation to the first-mentioned packing element, the second packing element being composed of laminæ of metals of different coefficients of expansion, the lamina having the higher coefficient being on the side adjacent the first-mentioned packing element, whereby, in case of accidental contact of the packing elements and consequent heating thereof, the second packing element will bend away from the first-mentioned packing element to prevent damage to the packing elements.

In testimony whereof, I have hereunto subscribed my name this 8th day of Dec., 1927.

CARL J. LAMB.